(12) United States Patent
Vega

(10) Patent No.: US 9,135,474 B2
(45) Date of Patent: Sep. 15, 2015

(54) PCB MOUNTED COVER ACTIVATED INTRUSION DETECTION SWITCH

(71) Applicant: RPX Corporation, San Francisco, CA (US)

(72) Inventor: Michael J. Vega, Longmont, CO (US)

(73) Assignee: RPX Corporation, San Francisco, CA (US)

( * ) Notice: Subject to any disclaimer, the term of this patent is extended or adjusted under 35 U.S.C. 154(b) by 118 days.

(21) Appl. No.: 13/860,235

(22) Filed: Apr. 10, 2013

(65) Prior Publication Data

US 2014/0268559 A1   Sep. 18, 2014

Related U.S. Application Data

(60) Provisional application No. 61/780,866, filed on Mar. 13, 2013.

(51) Int. Cl.
| | |
|---|---|
| *G06F 1/16* | (2006.01) |
| *G06F 21/86* | (2013.01) |
| *H01H 3/16* | (2006.01) |
| *H05K 1/02* | (2006.01) |
| *H05K 5/02* | (2006.01) |
| *H01H 13/18* | (2006.01) |
| *H05K 1/14* | (2006.01) |

(52) U.S. Cl.
CPC .............. *G06F 21/86* (2013.01); *H01H 3/161* (2013.01); *H05K 1/0275* (2013.01); *H05K 5/0208* (2013.01); *H01H 13/183* (2013.01); *H01H 13/186* (2013.01); *H05K 1/144* (2013.01); *H05K 2201/10151* (2013.01)

(58) Field of Classification Search
USPC ................... 713/198, 189, 153; 712/208, 29; 312/319.1, 223.1, 223.2, 223.3; 348/148, 836, 725, 794, 739, 152, 143; 250/221, 340, 338.1, 347, 338.3; 361/732, 801, 679.01, 679.26, 679.03, 361/679.27, 679.21, 679.22, 679.54, 361/679.09, 679.08, 679.41, 679.53, 361/679.57, 679.46, 679.31, 679.33; 165/301, 104.19, 104.13, 67, 96, 165/104.26, 104.11, 104.21; 345/172, 173, 345/174, 157
See application file for complete search history.

(56) References Cited

U.S. PATENT DOCUMENTS

| 7,208,720 | B2 * | 4/2007 | Hardin et al. ................. 250/221 |
|---|---|---|---|
| 8,677,155 | B2 * | 3/2014 | Chambourov ............... 713/194 |
| 2010/0024046 | A1 * | 1/2010 | Johnson et al. ................ 726/34 |
| 2011/0101837 | A1 * | 5/2011 | Solomon ................... 312/319.1 |
| 2012/0314069 | A1 * | 12/2012 | Taylor ........................... 348/148 |
| 2014/0173255 | A1 * | 6/2014 | Thantry et al. .............. 712/208 |

* cited by examiner

*Primary Examiner* — Hung Duong
(74) *Attorney, Agent, or Firm* — Withrow & Terranova, PLLC

(57) ABSTRACT

An intrusion detection switch is attached directly to a printed circuit board and utilized within an enclosure. Wires are not used to extend the switch to the top of the enclosure. An extension mechanism is used to extend a triggering portion of the intrusion detection switch to an engaging surface at the top of the enclosure. When the enclosure lid is properly shut, the engaging service is directed downward, thereby pushing an activation switch of the intrusion detection switch down. Switches may be assembled to an internal main printed circuit board where the switch is completely protected. Therefore, routing and maintaining of wiring to a switch is eliminated. A linkage system or mechanism can be mounted to the main chassis of the enclosure and act as an interface to an enclosure top cover. This eliminates potential damage to switches and wires and provides for a more reliable switch.

9 Claims, 4 Drawing Sheets

PCB MOUNTED COVER ACTIVATED INTRUSION DETECTION SWITCH

CROSS-REFERENCE TO RELATED APPLICATIONS

The present application claims the priority benefit of U.S. provisional application No. 61/780,866 filed Mar. 13, 2013 and entitled "PCB Mounted Cover Activated Intrusion Detection Switch," the disclosure of which is incorporated herein by reference.

BACKGROUND OF THE INVENTION

1. Field of the Invention

The present invention relates to intrusion detection switches. In particular, the present invention relates to cover activated intrusion detection switches.

2. Description of the Related Art

Data centers implement mass quantities of data storage enclosures. Typically, multiple data enclosures are maintained in racks and racks are lined up in rooms within the data center. To ensure reliable operation and protection, the enclosures are intended to be sealed closed with a lid.

Enclosures typically include an intrusion detection switch which detects when the lid for the enclosure is not properly engaged closed. Current intrusion detection switches are typically mounted near the top surface of the enclosure. The detection mechanism location is ideally suited for detecting the lid, but can be prone to physical damage. For example, the intrusion detection switch mounted near the top of an enclosure can potentially be damaged if the lid is dropped onto the switch or is not installed properly.

Additionally, wires for the switch must be maintained and secured to a switch mounted near the top of the enclosure so as not to be damaged during initial manufacture and customer site servicing. Accordingly, the potential for damage to either the switch or to electrical wires within an enclosure with increased hot swap/hot plug capability is increased. What is needed is an improved method for detecting intrusion of enclosures which implements a more secure intrusion detection switch.

SUMMARY OF THE CLAIMED INVENTION

An intrusion detection switch of the present invention is implemented such that it is soldered directly to a printed circuit board utilized within an enclosure. Wires are not used to extend the switch to the top of the enclosure. An extension mechanism is used to extend a triggering portion of the intrusion detection switch to an engaging surface at the top of the enclosure. When the enclosure lid is properly shut, the engaging surface is directed downward, thereby pushing an activation switch of the intrusion detection switch down. Switches may be assembled to an internal main printed circuit board where the switch is completely protected. Therefore, routing and maintaining of wiring to a switch is eliminated. A linkage system or mechanism can be mounted to the main chassis of the enclosure and act as an interface to a top cover of the enclosure. This eliminates potential damage to switches and wires and provides for a more reliable switch.

An embodiment of the present invention may include an enclosure, a printed circuit board, the intrusion detection mechanism and an extension member. The enclosure may have a bottom, front panel, back panel, and two side panels. The printed circuit board may include circuitry for managing data. The intrusion detection mechanism may be attached to the printed circuit board. The extension member may extend from the intrusion detection mechanism to above top surface of an enclosure panel. The extension mechanism may be forced downward towards the intrusion detection mechanism when a lid is placed over the top of the enclosure.

DETAILED DESCRIPTION

An intrusion detection switch within a server enclosure may be connected, for example via solder or other method, directly to a printed circuit board utilized within the enclosure. An extension mechanism is used to extend a triggering portion of the intrusion detection switch to an engaging surface at the top of the enclosure. Wires are not used to extend the switch to the top of the enclosure. When the enclosure lid is properly shut, the engaging surface is directed downward, thereby pushing an activation switch of the intrusion detection switch down. Switches may be assembled to an internal main printed circuit board where the switch is completely protected. Therefore, routing and maintaining of wiring to a switch is eliminated. A linkage system or mechanism can be mounted to the main chassis of the enclosure and act as an interface to a top cover of the enclosure. This eliminates potential damage to switches and wires and provides for a more reliable switch.

The intrusion detection switch may detect different levels of lid closure, and a sever enclosure may include multiple intrusion detection switches. An intrusion detection switch may detect different levels of lid closure. For example, a switch of the present invention may detect if a lid is completely closed, partially closed, or is not present at all. Additionally, including more than one intrusion detection switch may provide for a determining if a server enclosure lid is closed at multiple locations. For example, a server enclosure may include one or more intrusion detection switches near the top of the back of the enclosure, one or more sides of the enclosure, or even in the middle of the enclosure.

Figure 1:
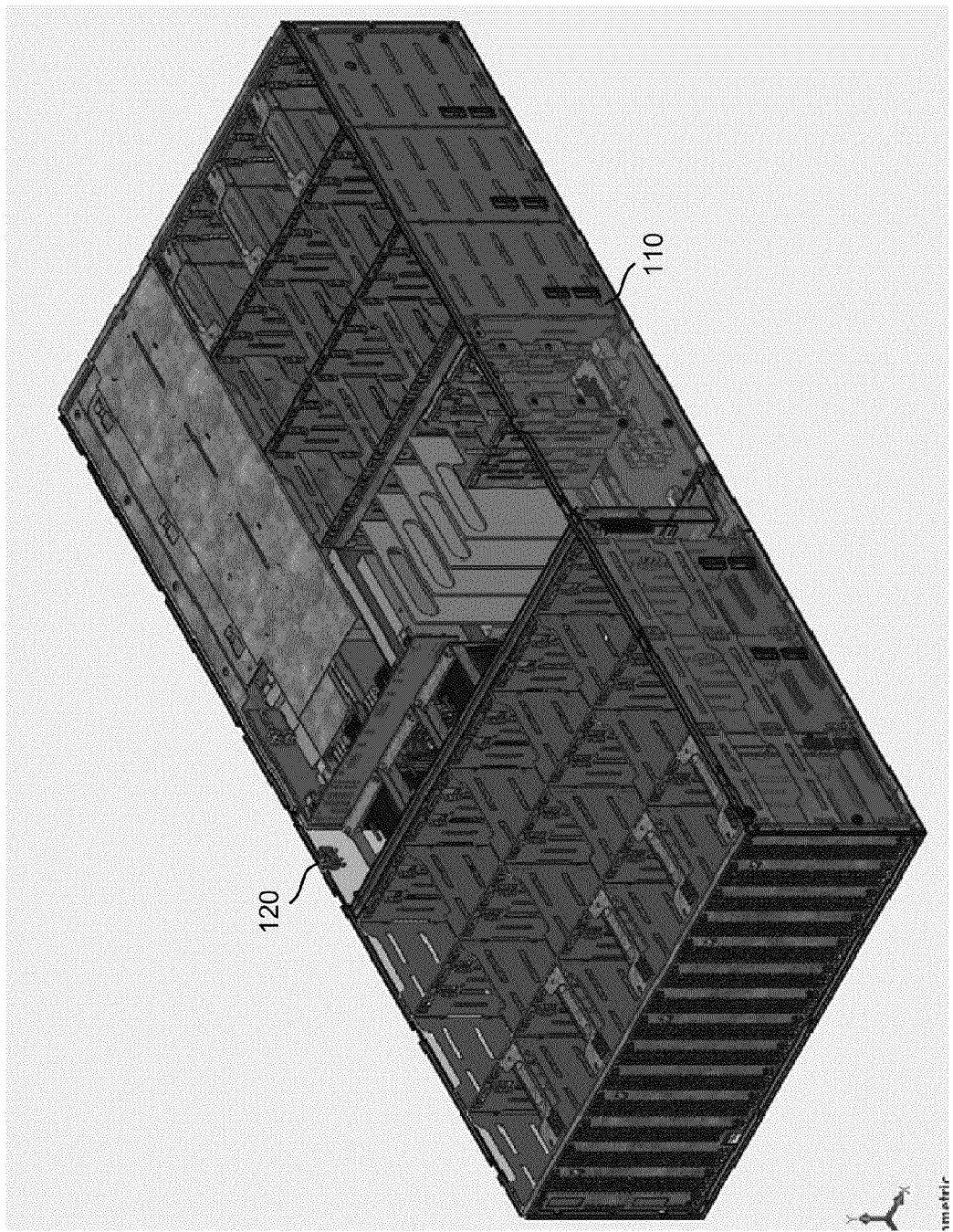
FIG. 1 is a perspective view of an enclosure with an intrusion detection switch of the prior art.

FIG. 1 is a perspective view of an enclosure with an intrusion detection switch of the prior art. The enclosure 110 may include processors, circuitry, storage devices, fans, power control units, and other components (not illustrated in FIG. 1). An enclosure may receive a lid or multiple lids that attach to the top of the enclosure. Intrusion detection switch 120 is attached to the sides of the enclosure near the top of one or both sides. Because the intrusion detection switch is mounted near the top, it is susceptible to damage at the top of the enclosure and requires wiring to communicate its status to the printed circuit board.

Figure 2:
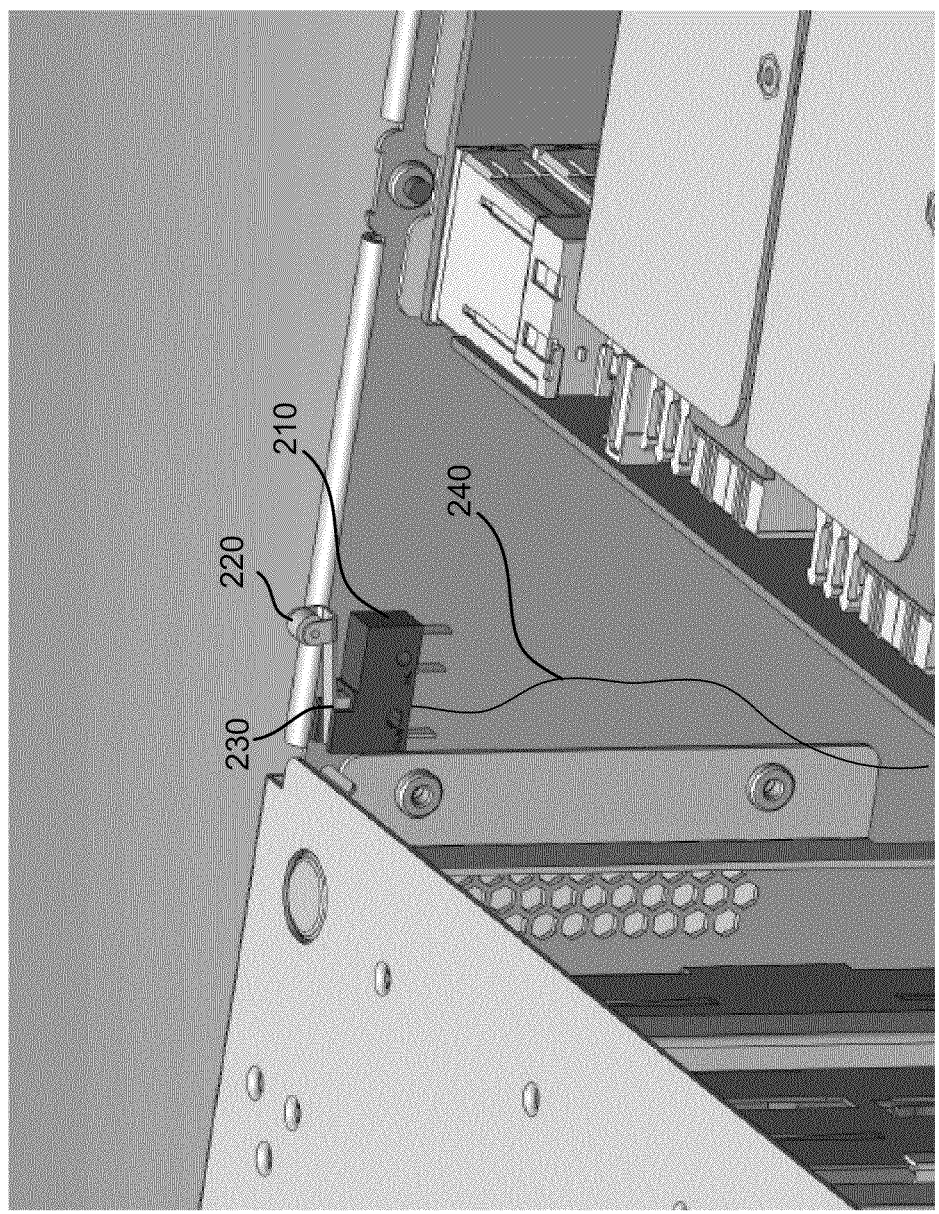
FIG. 2 is an illustration of an intrusion detection switch of the prior art.

FIG. 2 illustrates an intrusion detection switch of the prior art. The intrusion detection switch of FIG. 2 includes intrusion detection switch body 210, activating member 220, and spring loaded open circuit 230. The intrusion detection switch mounted near the inner side of the enclosure walls may include wires 240 which reach down to a printed circuit board near the bottom of the enclosure. As a lid is attached to the top of the enclosure, the lid presses down actuating member 220.

As actuating member 220 is depressed downward, spring loaded open circuit 230 becomes a closed circuit and a signal may be sent through wires 240 to the printed circuit board.

Figure 3:
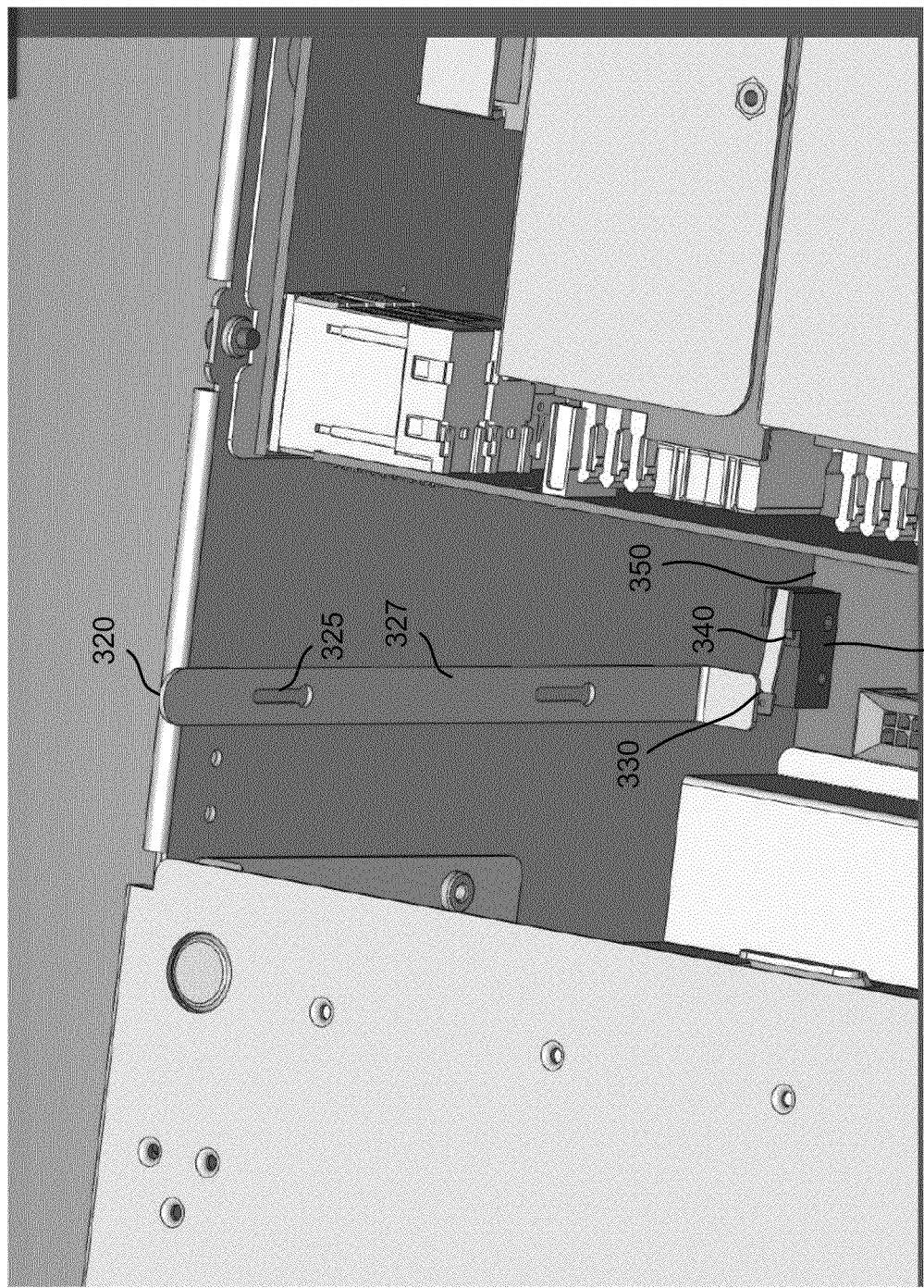
FIG. 3 illustrates an intrusion detection switch of the present invention.

FIG. 3 illustrates an intrusion detection switch of the present invention. The intrusion detection switch of FIG. 3 includes intrusion detection switch body 310, engaging surface 320, guiding aperture 325, extension mechanism 327, activation member 330, and spring loaded open circuit 340. Rather than engage the activation member directly, such as in the intrusion detection switch of the prior art, a lid attached to the top of the enclosure will engage engaging surface 320 of extension mechanism 327. When engaged, engaging surface 320 pushes downward on extension mechanism 327. The extension mechanism motion in an up and down manner may be guided by guiding apertures 325. When pushed downward, extension mechanism 327 pushes activating member 330 downward. As a result, spring loaded open circuit 340 may eventually close when a lid to the enclosure is installed and shut properly.

The intrusion detection switch may be communicatively coupled to one or more processors or other circuitry within a device, such as for example a server enclosure. When engaged, or not engaged, the switch may provide a signal to the processor or circuitry to communicate the status of the lid. For example, the switch may provide a high signal when the lid is not attached, and provide a low signal when the lid is in position and the switch is engaged to a different position.

The intrusion detection switch of FIG. 3 is installed directly to printed circuit board 350. The intrusion detection switch may connectively coupled via solder or some other conductive means. As such, intrusion detection switch 310 may be soldered or otherwise directly attached to connections on the printed circuit board.

Figure 4:
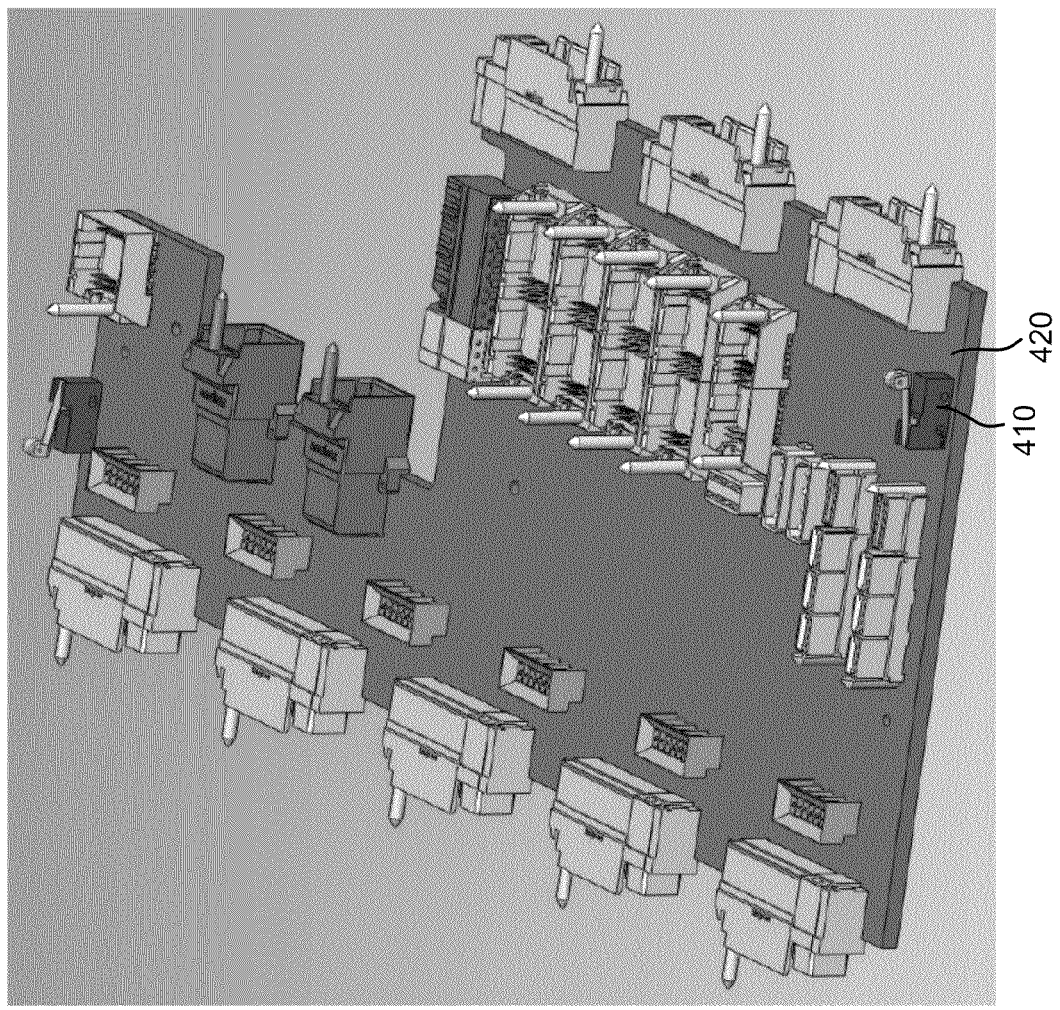
FIG. 4 illustrates an intrusion detection switch attached to a printed circuit board.

FIG. 4 illustrates an intrusion detection switch attached to a printed circuit board. Printed circuit board 420 includes many connections and elements attached to its surface. Intrusion detection switch 410 is attached to the printed circuit board near the edge of the board. As the printed circuit board is installed within the enclosure, switch mechanism 410 is already in position at the printed circuit board and may be attached to engage extension mechanism 327 installed along the side of the enclosure frame.

In embodiments, the intrusion switch may be implemented with alternative features. For example, the switch may utilize a Hall effect switch, optical interrupt sensing circuitry, and other switch or presence detection technology. The linkage mechanism may incorporate a rolling surface or dimpled hemisphere or other shape or low friction contact surface for surface 320. The linkage may actuate a switch more than one time as the top cover lid is pushed forward into locking position. This may enable detection of a partially engaged lid. The top cover may have several ridges or bumps that actuate the linkage and switch at different positions and/or locations to identify the position of cover, which may then be communicated or reported to an administrator. The different positions may include but are not limited to one or more levels of partially open, completely open, completely closed, and not present.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. An intrusion detection mechanism, comprising:
    an enclosure having a bottom, front panel, back panel, and two side panels;
    a printed circuit board having circuitry for managing data;
    an intrusion detection mechanism attached to the printed circuit board, wherein the intrusion mechanism includes the following positions:
        a first position indicating that the front, back, and two side panels is installed,
        a second position indicating that the front, back, and two side panels is partially installed, and
        a third position indicating that the front, back, and two side panels is not installed;
    an extension member extending from the intrusion detection mechanism to above a top surface of at least one of the panels, the extension mechanism forced downward towards the intrusion detection mechanism when a lid is placed over the top of the enclosure.

2. The intrusion detection mechanism of claim 1, wherein the intrusion detection mechanism includes a spring activated lever that closes an open circuit when the extension member is forced downward.

3. The intrusion detection mechanism of claim 1, wherein the intrusion detection mechanism has an open circuit when the extension member is at rest when extending above the top of the enclosure.

4. The intrusion detection mechanism of claim 1, further comprising a power control unit providing power to the printed circuit board and the intrusion detection mechanism, wherein the intrusion detection mechanism triggers a signal to be sent to the printed circuit board when the circuit is open.

5. The intrusion detection mechanism of claim 1, wherein the extension mechanism is guided by one or more rails.

6. A server enclosure, comprising:
    a printed circuit board disposed within the server;
    circuitry communicatively coupled to the printed circuit board; and
    an intrusion detection switch attached to the printed circuit board, the intrusion detection switch transmitting a signal to the circuitry via the printed circuit board upon detecting a plurality of positions a lid for the server enclosure, wherein the intrusion detection switch includes the following positions:
        a first position indicating that the lid is installed,
        a second position indicating that the lid is partially installed, and
        a third position indicating that the lid is not installed.

7. The server enclosure of claim 6, further comprising a second intrusion detection switch attached to the printed circuit board and a second extension member extending from the intrusion detection mechanism to above top surface of an enclosure panel, the second intrusion detection switch transmitting a signal to the circuitry upon detecting that the lid for the server enclosure is disposed at a different location within the server enclosure.

8. The server enclosure of claim 6, wherein the intrusion detection switch includes a spring.

9. The server enclosure of claim 6, wherein the intrusion detection switch includes an optical sensor.

* * * * *